US011770887B2

United States Patent
Engelen

(10) Patent No.: US 11,770,887 B2
(45) Date of Patent: Sep. 26, 2023

(54) LIGHTING CONTROL SYSTEM FOR CONTROLLING A PLURALITY OF LIGHT SOURCES BASED ON A SOURCE IMAGE AND A METHOD THEREOF

(71) Applicant: SIGNIFY HOLDING B.V., Eindhoven (NL)

(72) Inventor: Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 85 days.

(21) Appl. No.: 16/770,739

(22) PCT Filed: Nov. 27, 2018

(86) PCT No.: PCT/EP2018/082621
§ 371 (c)(1),
(2) Date: Jun. 8, 2020

(87) PCT Pub. No.: WO2019/110360
PCT Pub. Date: Jun. 13, 2019

(65) Prior Publication Data
US 2020/0374998 A1 Nov. 26, 2020

(30) Foreign Application Priority Data
Dec. 7, 2017 (EP) .................................... 17205810

(51) Int. Cl.
*H05B 47/105* (2020.01)
*G06T 7/90* (2017.01)
(Continued)

(52) U.S. Cl.
CPC ............. *H05B 47/105* (2020.01); *G06T 7/90* (2017.01); *H05B 45/20* (2020.01); *H05B 45/22* (2020.01);
(Continued)

(58) Field of Classification Search
CPC ...... H05B 45/28; H05B 47/155; H05B 35/00; H05B 39/00; H05B 41/00; H05B 45/00; H05B 46/00
See application file for complete search history.

(56) References Cited

U.S. PATENT DOCUMENTS 9,198,252 B2  11/2015  Laski et al.
9,565,736 B2   2/2017  Aliakseyeu et al.
(Continued)

FOREIGN PATENT DOCUMENTS

WO   2013121311 A1   8/2013
WO   2017025324 A1   2/2017
(Continued)

*Primary Examiner* — Wei (Victor) Y Chan

(57) ABSTRACT

A method of controlling a plurality of light sources based on a source image is disclosed. The method comprises controlling a first light source according to a first light setting based on a first color of the source image, receiving an input indicative of a change of the first light setting of the first light source, determining a color of the changed first light setting, modifying the source image by modifying the first color in the source image based on the color of the changed light setting, and rendering the modified image on a display.

14 Claims, 3 Drawing Sheets

(51) Int. Cl.
  *H05B 45/22*    (2020.01)
  *H05B 45/20*    (2020.01)
  *H05B 47/155*   (2020.01)

(52) U.S. Cl.
  CPC .. *H05B 47/155* (2020.01); *G06T 2207/10024* (2013.01)

(56) References Cited

U.S. PATENT DOCUMENTS

2005/0248299 A1* 11/2005 Chemel ................ H05B 47/155
                                                      315/312
2016/0262239 A1*  9/2016 Hole ..................... H05B 47/155
2018/0018793 A1*  1/2018 Min ......................... H04N 1/60

FOREIGN PATENT DOCUMENTS

| WO | 2017080879  | A1 | 5/2017 |
| WO | 2017081054  | A1 | 5/2017 |
| WO | 2017085046  | A1 | 5/2017 |
| WO | 2017097741  | A1 | 6/2017 |
| WO | 20170156193 | A1 | 9/2017 |

\* cited by examiner

300

LIGHTING CONTROL SYSTEM FOR CONTROLLING A PLURALITY OF LIGHT SOURCES BASED ON A SOURCE IMAGE AND A METHOD THEREOF

CROSS-REFERENCE TO PRIOR APPLICATIONS

This application is the U.S. National Phase application under 35 U.S.C. § of International Application No. PCT/EP2018/082621, filed on Nov. 27, 2018, which claims the benefit of European Patent Application No. 17205810.9, filed on Dec. 7, 2017. These applications are hereby incorporated by reference herein.

FIELD OF THE INVENTION

The invention relates to a method of controlling a plurality of light sources based on a source image, and to a computer program product for executing the method. The invention further relates to a lighting control system for controlling a plurality of light sources based on a source image.

BACKGROUND

Home and professional environments contain a large number of lighting devices for creation of ambient, atmosphere, accent or task lighting. These controllable lighting devices may be controlled via user interface of a control device, for example a smartphone, via a (wireless) network. An example of such a user interface is disclosed in patent application WO 2013121311 A1, which discloses a remote control unit that comprises a user interface through which a user may identify an area in an image and a light source. The identified image area is linked with the light source and color information of the identified image area is transmitted to the light source. The light setting of the light source is thereby controlled based on the color information. A user is thereby enabled to pick the color to be outputted by a light source by selecting an area in an image displayed on the remote control unit.

SUMMARY OF THE INVENTION

The inventor has realized that when the light setting of a light source is changed after the light source has been controlled based on an image, the image may no longer represent the (current) light setting. It is therefore an object of the present invention to provide a system and a method that provide an image which is representative for the (current) light setting after the light setting has been changed.

According to a first aspect of the present invention, the object is achieved by a method of controlling a plurality of light sources based on a source image, the method comprising:
  controlling a first light source according to a first light setting based on a first color of the source image,
  receiving an input indicative of a change of color of the first light setting of the first light source,
  determining a color of the changed first light setting,
  modifying the source image by modifying the first color in the source image based on the color of the changed light setting, and
  rendering the modified image on a display.

The first light source is controlled based on the first color of the source image. The source image may, for example, contain a plurality of colors. The first color, e.g. green, may be automatically extracted from the image. Alternatively, a user may select an area in the image to pick the first color, e.g. green, from the image. Subsequently, the first light source may be controlled such that it emits light according to a first light setting (e.g. green light) based on the first color. An input indicative of a change of the first light setting may be received, for instance from green light to red light. The change may be generated based on a sensor input, based on an input from a lighting control software program, based on a user input received via a user interface, etc. Upon determining that the first light setting of the first light source has changed, the source image is modified by modifying the first color in the source image (e.g. by changing a hue of green pixels in the source image to red pixels). By modifying the source image based on the new light setting, the modified source image better reflects/represents the current light setting.

The method may further comprise: controlling a second light source according to a second light setting based on a second color of the source image, and the step of modifying the source image may comprise substantially maintaining the second color in the source image. It is beneficial to maintain the colors of other light sources, of which the light setting is also based on the source image, when changing the first color in the source image, because this results in that the modified source image reflects/represents the current light setting even better.

The method may further comprise: reverting the modified image to the source image upon receiving a user input indicative thereof, and controlling the first light source according to the first light setting. This enables a user to provide a user input to go back to the source image and the initial light setting associated with the source image.

The method may further comprise: analyzing the source image, and extracting the first color and the second color from the source image. The first color (and, optionally, the second color) may be automatically extracted/retrieved from the source image. Additionally or alternatively, the method may further comprise rendering the source image on the display, and receiving user input indicative of a selection of the first color from the source image. This enables a user to select the initial first color (and, optionally, the second color) from the source image, which will be used for controlling the first light source (and, optionally, the second light source).

The step of modifying the first color in the source image may comprise: modifying a hue, saturation and/or brightness of the first color of the source image. If, for instance, the light intensity of the light output of the light source is changed, the brightness of the first color in the source image may be modified as a function thereof. If, for instance, the hue of the light output of the light source is changed, the hue of the first color in the source image may be modified as a function thereof. If, for instance, the saturation of the light output of the light source is changed, the saturation of the first color in the source image may be modified as a function thereof.

The step of modifying the first color in the source image may comprise: applying an image filter to the source image. If, for instance, the light intensity of the light output of the light source is changed, a brightness filter may be applied to (at least a part of) the source image as a function of the light intensity. If, for instance, the hue of the light output of the light source is changed, a color filter may be applied to (at least a part of) the source image as a function of the hue. If, for instance, the saturation of the light output of the light source is changed, a black and white filter may be applied to (at least a part of) the source image as a function of the saturation.

The step of modifying the first color in the source image may comprise: selecting pixels in the source image that have a pixel color similar to the first color, and modifying pixel colors of the selected pixels based on the color of the changed light setting. This enables changing only the color of pixels that have the same or a similar color of the changed light setting (e.g. the same hue).

The method may further comprise the step of storing the modified image in a memory. The method may further comprise the step of storing the light settings of the plurality of light sources, which light settings are associated with the modified image, in the memory. This may allow a user to provide a user input (e.g. via a user interface) to select a stored modified image from the memory to control the plurality of light sources according to the light settings associated with the selected stored modified image.

The input indicative of the change of the first light setting may be a signal received from a lighting control device. The lighting control device may, for instance, be a smartphone, a light switch, a smart home hub, a smart speaker, or any other device configured to control the light sources. The input may be generated automatically, e.g. by a software application running on the lighting control device.

The input indicative of the change of the first light setting may be a user input received via a user interface. The user interface may be part of the lighting control device. The user may, for instance, select the first light source via the user interface and select a color for the first light source. This enables the user to control the light source.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a lighting control system for controlling a plurality of light sources based on a source image, the lighting control system comprising:
 a display,
 a processor configured to control a first light source according to a first light setting based on a first color of the source image, and to receive an input indicative of a change of color of the first light setting,
wherein the processor is further configured to determine a color of the changed first light setting, and to modify the source image by modifying the first color in the source image based on the color of the changed light setting, and to render the modified image on the display.

The display and the processor (and, in some embodiments, a communication unit) may be comprised in a single lighting control device, such as a smartphone, a tablet pc, a pair of smart glasses, augmented reality glasses, etc. Alternatively, the components of the lighting control system may be comprised in multiple coupled devices. The lighting control system may further comprise the plurality of light sources.

It should be noted that the computer program product and the lighting control system may have similar or identical embodiments and advantages as the claimed method.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
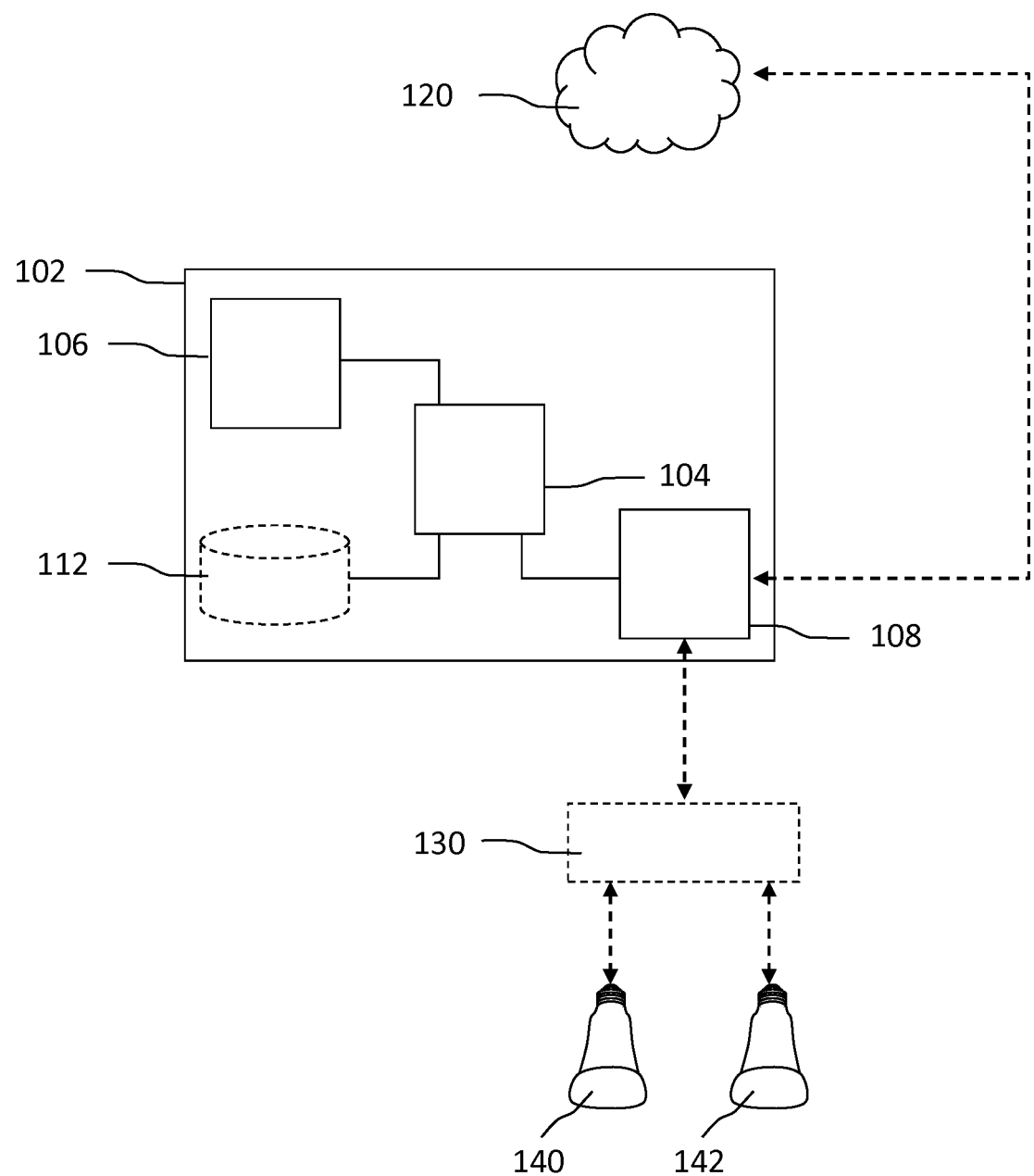
FIG. 1 shows schematically an embodiment of a system for controlling a plurality of light sources based on a source image.

FIG. 1 shows a system 100 for controlling a plurality of light sources 140, 142. The system 100 comprises a lighting control device 102. The lighting control device 102 may, for example, be a smartphone, a tablet pc, a pair of smart glasses, augmented reality glasses, a home control system, etc. The lighting control device 102 comprises a display 106 configured to display images. The lighting control device 102 further comprises a processor 104 (e.g. a microchip, a microcontroller, circuitry, etc.) configured to control a first light source 140 according to a first light setting based on a first color of a source image. The processor 104 is further configured to receive an input indicative of a change of the first light setting of the first light source 140. The lighting control device 102 may comprise a communication unit 108 (e.g. a receiver or transceiver) configured to receive the input indicative of the change of the first light setting of the first light source 140. The processor 104 is further configured to determine a color of the changed first light setting of the first light source 140, and to modify the source image by modifying the first color in the source image based on the color of the changed light setting. The processor 104 is further configured render the modified image on the display 106.

The processor 104 may be configured to analyze the source image to extract colors for controlling the plurality of light sources 140, 142. The processor may use any known image analysis method for extracting the colors. Alternatively, the processor 104 may obtain the source image and a color palette associated with that source image. The lighting control device may, for instance, comprise a memory 112 configured to store associations between source images and color palettes, and/or the communication unit/transceiver 108 may be configured to communicate with a remote memory 120 configured to store the associations.

Additionally or alternatively, the lighting control device 102 may comprise a user interface configured to receive a user input indicative of a selection of the source image. The display 106 may for example comprise a touch sensitive element for receiving the user input. Additionally or alternatively, the user interface may comprise other user input means, such as a microphone for receiving a voice input or a camera for receiving gesture input. This enables a user to select the source image, for instance from a database of source images. In embodiments, the lighting control device 102 may comprise a camera for capturing the source image. The source image may be generated/provided by a software application running on the lighting control device, or by a software application running on a remote device. The source image may be provided by the software application and the source image may be based on media content such as video, music or game content. The processor 104 may render the source image on the display 102, whereupon a user may select the first color in the image via the user interface.

The processor 104 is configured to receive an input indicative of a change of the first light setting. In embodiments, the lighting control device 102 may comprise a user interface for receiving a user input indicative of a change of the first light setting of the first light source, which enables the processor 104 to determine when a light setting of a light source has been changed. Alternatively, the first light setting of the first light source may be changed by a remote device (e.g. another lighting control device). Therefore, the lighting control device 102 may comprise a communication unit 108 configured to receive an input indicative of a change of the first light setting of the first light source 140. The communication unit 108 may communicate with the light sources 140, 142 directly or indirectly, for instance via a router or bridge 130. Various wired and wireless communication protocols may be used, for example Ethernet, DMX, DALI, USB, Bluetooth, Wi-Fi, Li-Fi, 3G, 4G or ZigBee. The communication unit 108 may be further configured to communicate lighting control commands to the light sources 140, 142.

Figure 2:
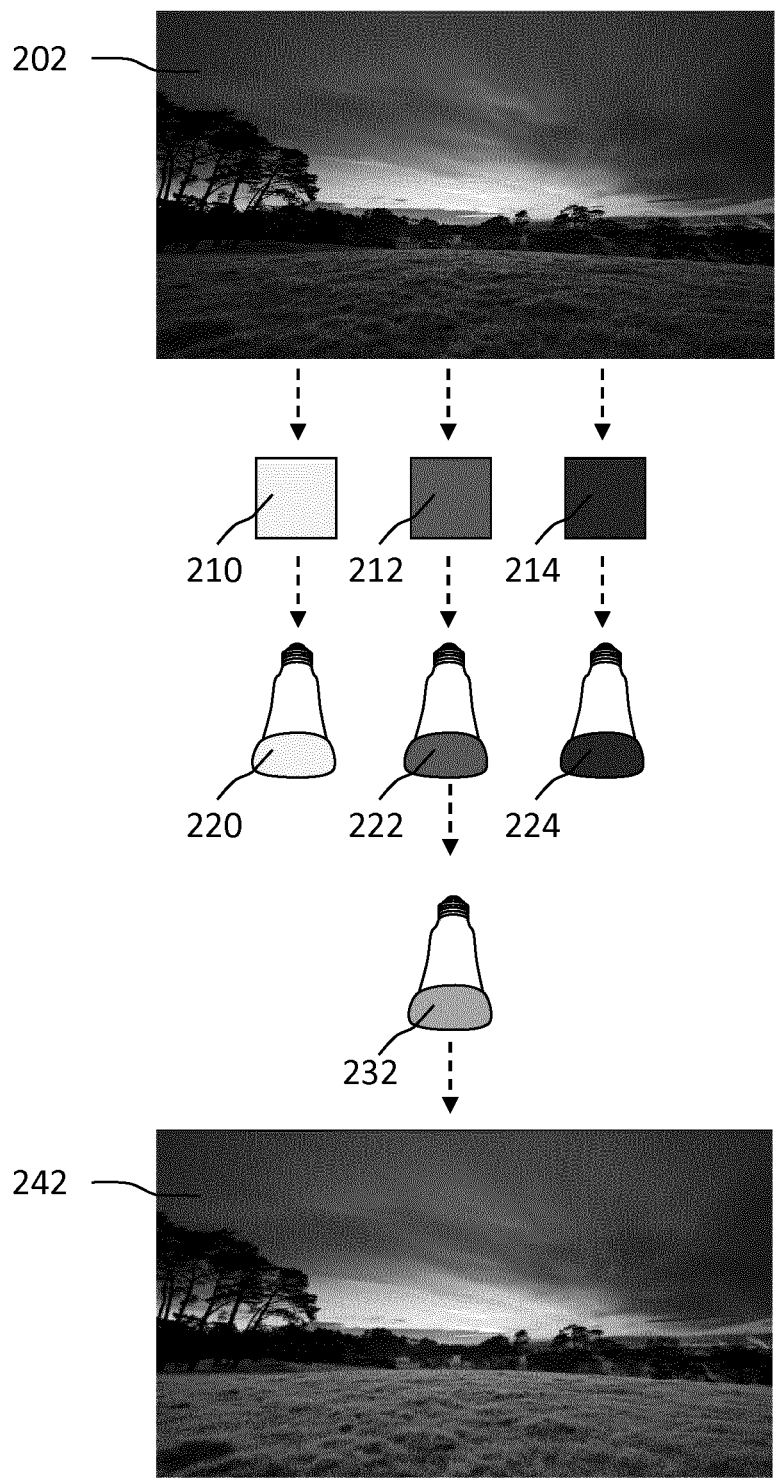
FIG. 2 shows schematically the steps of controlling a plurality of light sources based on a source image, changing the light setting of a light source, and modifying the source image.

FIG. 2 illustrates an example of a process of controlling a plurality of light sources 220, 222, 224 based on a source image 202, and modifying the source image 202 based on a change of the light setting of a light source 222. The colors 210, 212 and 214 may be associated with or extracted from the source image 202. In the example of FIG. 2, the first color 210 (yellow) is based on the setting sun in the source image 202, the second color 212 (green) is based on the green grass in the source image 202 and the third color 214 (dark green) is based on the green trees in the source image 202. The three light sources 220, 222 and 224 may be controlled based on the three colors 210, 212 and 214, respectively. In this example, the light setting of light source 222 is changed to a different color, for example to a light orange color 232. Based on this change, the source image is 202 is modified. In the modified image 242, the hue of the grass is changed from the original green color to the orange of the light source 222/232.

The processor 104 is configured to modify the source image by modifying the first color in the source image based on the color of the changed light setting. The processor 104 may be configured to modify the first color in the source image by modifying a hue, saturation and/or brightness of the first color of the source image. If, for instance, the light intensity of the light output of the first light source 140 is changed, the brightness of the first color in the source image may be modified as a function thereof. If, for instance, the hue of the light output of the first light source 140 is changed, the hue of the first color in the source image may be modified as a function thereof. If, for instance, the saturation of the light output of the first light source 140 is changed, the saturation of the first color in the source image may be modified as a function thereof. Different techniques for modifying one or more colors in the source image may be applied.

In a first example, wherein the first color is based on an area of the source image, the processor 104 may be configured to change the color only in the area where the first color was based on. For instance, referring to source image 202, the green color 212 of the grass may be based on the area in the image wherein the grass is present. The area may be user-defined, predefined or determined by analyzing the images using known image analysis techniques. Upon determining a change of the light setting of the light source 222 that was controlled according to the green color, the processor 104 may change the color in the area in the image wherein the grass is present.

In a second example, the processor 104 may be configured to apply an image filter to the source image. The image filter may, for example, be a color filter. The color filter may for example be a filter that changes the hue/saturation/brightness of the full image. Thus, when a change of a light setting of a light source has been determined, a color filter based on the changed light setting may be applied to the source image to modify the hue/saturation/brightness of the full image. Alternatively, the image filter may be applied to a part/area of the source image or to a certain range of colors in the source image.

In a third example, the processor 104 may be configured to select pixels in the source image that have a pixel color similar to the first color (i.e. the initial color of according to which the first light source 140 was controller), and to modify pixel colors of the selected pixels based on the color of the changed light setting. This enables changing only the color of pixels that have a color similar to the color of the changed light setting (e.g. the same hue).

The processor 104 may be further configured to control a second light source 142 according to a second light setting based on a second color of the source image. Additionally, the processor 104 may modify the source image such that the second color, on which the second light setting is based, is substantially maintained the source image. Thus, the processor 104 may maintain the colors of light sources other than the first light source 140, of which the light setting is also based on the source image, when modifying the first color in the source image. As a result, the modified image reflects/represents the current light setting of the first light source 140 and the other light sources 142 even better.

The processor 104 may be further configured to revert the modified image to the source image, and control the first light source 140 according to the first light setting (and, when the second light setting of the second light source 142 also has been changed, to control the second light source 142 according to the initial second light setting). A user may provide a user input via the user interface (e.g. by pressing a touch input or a voice input) to revert back to the original source image, and therewith back to the original light settings associated with the source image.

The processor 104 may be further configured to store the modified image in a memory. The memory 112, 120 may for example be comprised in a mobile device 102, or at a remote location such as in a remote server 120 accessible via a network. The mobile device 102 may further comprise a user interface configured to receive a user input indicative of a selection of a stored modified image. The processor 104 may be further configured to retrieve a stored modified image from the memory upon receiving the user input. This enables a user to store and retrieve (favorite) modified images (and light settings associated with those images).

Figure 3:
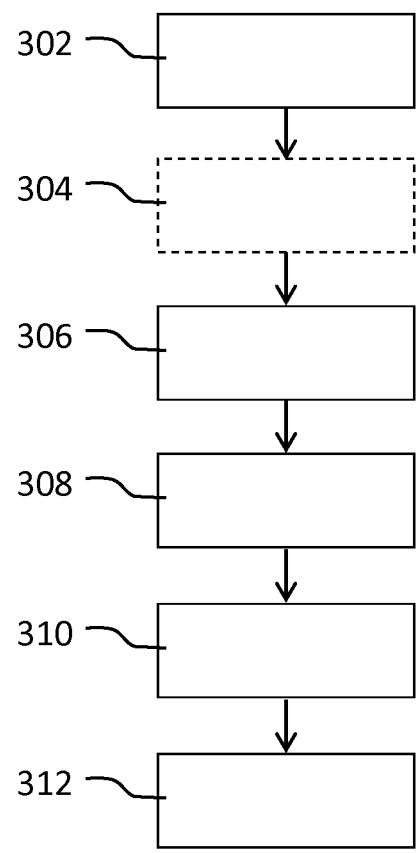
FIG. 3 shows schematically steps of a method of controlling a plurality of light sources based on a source image.

FIG. 3 shows schematically steps of a method 300 of controlling a plurality of light sources 140, 142 based on a source image. The method 300 comprises the steps of: controlling 302 a first light source 140 according to a first light setting based on a first color of the source image, receiving 306 an input indicative of a change of the first light setting of the first light source 140, determining 308 a color of the changed first light setting, modifying 310 the source image by modifying the first color in the source image based on the color of the changed light setting, and rendering 312 the modified image on a display 106. The method may comprise the step of controlling 304 a second light source 412 according to a second light setting based on a second color of the source image, wherein the step of modifying the source image comprises substantially maintaining the second color in the source image.

The method 300 may be executed by computer program code of a computer program product when the computer program product is run on a processing unit of a computing device, such as the processor 104.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a plurality of light sources based on a source image, the method comprising:
   controlling a first light source according to a first light setting based on a first color of the source image,
   receiving an input indicative of a change of color of the first light setting of the first light source,
   determining a color of the changed first light setting,
   controlling a second light source according to a second light setting based on a second color of the source image,
   modifying the source image by modifying the first color in the source image based on the color of the changed light setting by selecting pixels in the source image that have a pixel color similar to the first color and modifying pixel colors of the selected pixels based on the color of the changed light setting, while substantially maintaining the second color in the source image,
   rendering the modified image on a display, and
   reverting the modified image to the source image upon receiving a user input indicative thereof.

2. The method of claim 1, further comprising:
   controlling the first light source according to the first light setting.

3. The method of claim 1, further comprising:
   analyzing the source image, and
   extracting the first color from the source image.

4. The method of claim 1, further comprising:
   rendering the source image on the display, and
   receiving user input indicative of a selection of the first color from the source image.

5. The method of claim 1, wherein the step of modifying the first color in the source image comprises modifying a hue, saturation and/or brightness of the first color of the source image.

6. The method of claim 1, wherein the step of modifying the first color in the source image comprises: applying an image filter to the source image.

7. The method of claim 1, further comprising:
   storing the modified image in a memory.

8. The method of claim 1, wherein the input indicative of the change of the first light setting is a signal received from a lighting control device.

9. The method of claim 1, wherein the input indicative of the change of the first light setting is a user input received via a user interface.

10. A non-transitory computer-readable storage device with computer-executable instructions stored thereon that, when executed by one or more computer processors, cause the one or more computer processors to perform operations configured to perform the method of claim 1.

11. The method of claim 1, wherein selecting the pixels in the source image that have the pixel color similar to the first color comprises selecting the pixels that have a same hue as the first color.

12. A lighting control system for controlling a plurality of light sources based on a source image, the lighting control system comprising:
   a display, and
   a processor configured to control a first light source according to a first light setting based on a first color of the source image, to control a second light source according to a second light setting based on a second color of the source image, and to receive an input indicative of a change of color of the first light setting, wherein the processor is further configured to determine a color of the changed first light setting, to modify the source image by modifying the first color in the source image based on the color of the changed light setting by selecting pixels in the source image that have a pixel color similar to the first color and modifying pixel colors of the selected pixels based on the color of the changed light setting while substantially maintaining the second color in the source image, to render the modified image on the display, and to revert the modified image to the source image upon receiving a user input indicative thereof.

13. The lighting control system of claim 12, further comprising the plurality of light sources.

14. A method of controlling a plurality of light sources based on a source image, the method comprising:

controlling a first light source according to a first light setting based on a first color of the source image, receiving an input indicative of a change of color of the first light setting of the first light source, determining a color of the changed first light setting, controlling a second light source according to a second light setting based on a second color of the source image, modifying the source image by modifying the first color in the source image based on the color of the changed light setting by selecting pixels in the source image that have a pixel color similar to the first color and modifying pixel colors of the selected pixels based on the color of the changed light setting while substantially maintaining the second color in the source image, modifying the first color including at least selecting pixels in the source image that have a pixel color similar to the first color and modifying pixel colors of the selected pixels based on the color of the changed light setting, rendering the modified image on a display, and reverting the modified image to the source image upon receiving a user input indicative thereof.

* * * * *